United States Patent
Chiba et al.

(10) Patent No.: US 10,261,662 B2
(45) Date of Patent: Apr. 16, 2019

(54) CONTEXT BASED SELECTION OF MENUS IN CONTEXTUAL MENU HIERARCHIES

(71) Applicant: Microsoft Technology Licensing, LLC, Redmond, WA (US)

(72) Inventors: Kenichiro Chiba, Redmond, WA (US); Hani Farouq Aref Abu-Huwaij, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 14/846,140

(22) Filed: Sep. 4, 2015

(65) Prior Publication Data

US 2017/0068400 A1    Mar. 9, 2017

(51) Int. Cl.
*G06F 3/0482* (2013.01)

(52) U.S. Cl.
CPC .................... *G06F 3/0482* (2013.01)

(58) Field of Classification Search
CPC ............... G06F 3/0482; G06F 3/04842; G06F 3/04817; G06F 17/30572; G09G 5/377
See application file for complete search history.

(56) References Cited

U.S. PATENT DOCUMENTS

| | | |
|---|---|---|
| 6,493,006 B1 | 12/2002 | Gourdol et al. |
| 7,581,194 B2 | 8/2009 | Iwema et al. |
| 8,423,912 B2 | 4/2013 | Irani et al. |
| 2004/0165012 A1 | 8/2004 | Nelson et al. |
| 2010/0011319 A1 | 1/2010 | Gourdol et al. |
| 2010/0064255 A1 | 3/2010 | Rottler et al. |
| 2011/0016425 A1 | 1/2011 | Homburg et al. |
| 2011/0202879 A1* | 8/2011 | Stovicek ............... G06F 3/0482 715/828 |
| 2012/0072867 A1 | 3/2012 | Schlegel |
| 2013/0019172 A1 | 1/2013 | Kotler et al. |
| 2013/0174041 A1* | 7/2013 | Chakravarthy ....... G06F 3/0482 715/733 |
| 2013/0227482 A1 | 8/2013 | Thorsander et al. |
| 2014/0282254 A1 | 9/2014 | Feiereisen et al. |
| 2015/0378982 A1* | 12/2015 | McKenzie et al. ... G06F 3/0482 715/261 |
| 2016/0179798 A1* | 6/2016 | Franks .................. G06F 3/0483 715/739 |
| 2017/0052659 A1* | 2/2017 | Ivanov .............. G06F 17/30867 |

OTHER PUBLICATIONS

"iPhone | Context Menu", Published on: Mar. 21, 2013 Available at: https://www.logos.com/support/bible/iphone/context-menu.

Hollington, Jesse, "Instant Expert: Secrets & Features of iOS 5.0", Published on: Oct. 12, 2011 Available at: http://www.ilounge.com/index.php/articles/comments/instant-expert-secrets-features-of-ios-5.0/P4.

"Horizontal Submenus", Published on: Dec. 14, 2013 Available at: http://thememos.dottoro.com/features/menu/horizontal-sub-menu/#.

* cited by examiner

*Primary Examiner* — Mandrita Brahmachari

(57) ABSTRACT

Enhanced contextual menu technology is disclosed herein. In an implementation, when a user selects content in a user interface to an application, a context associated with the content is identified. A child menu in a contextual menu hierarchy is then selected based on the context and is rendered in the user interface. In some implementations, the child menu includes a navigational element that links back to a parent of the child menu in the contextual menu hierarchy.

20 Claims, 10 Drawing Sheets

CONTEXT BASED SELECTION OF MENUS IN CONTEXTUAL MENU HIERARCHIES

TECHNICAL BACKGROUND

A contextual menu is a menu in a graphical user interface that appears upon user interaction, such as a touch, right-click mouse operation, or other types of user input made with respect to an object. Contextual menus offer a set of controls that may vary based on the context surrounding the object.

For example, selecting a word that has been flagged as misspelled may result in a proofing menu with suggestions for correcting the misspelled word. Selecting an un-flagged word may result in an edit menu being displayed that includes various controls for editing the content in general, such as cut, copy, and paste controls.

Some contextual menus may adhere to a menu hierarchy, in that one menu may be considered a parent with respect to one or more child menus. This may be the case when, for instance, one menu is used more widely or under basic circumstances, while another menu is surfaced in response to a particular context. In the example above, the edit menu may be considered a parent of the proofing menu, as well as the parent of other menus such as a hyperlink menu, a formatting menu, and the like.

Navigating between parent and children menus can be a sub-optimal experience in many scenarios. In an example where a proofing menu has been surfaced in association with a misspelled word, navigating to its parent menu typically requires the user to cancel out of the child menu (usually by touching elsewhere in the user interface). The user must then re-select the word. But this only surfaces the parent menu if the word has been corrected. If it remains in a misspelled state, the child menu will surface again.

Such problems are alleviated in some scenarios by surfacing two contextual menus at once. But this solution can cause other problems, such as content and menu occlusions, especially on small form-factor devices. In addition, showing a main menu and submenu at the same time adds to the complexity of the user experience. While the main menu could be closed by the user, allowing the user to view just the sub-menu, returning to the main menu is still burdensome.

The limited screen real-estate that is available on small-form factor devices introduces other problems with respect to contextual menus. In one problem, relatively long contextual menus with many controls can be difficult to fit in the vertical direction, especially when a soft keyboard is present.

OVERVIEW

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

Technology is disclosed herein that enhances contextual menus and the operation thereof. In an implementation, when a user selects content in a user interface to an application, a context associated with the content is identified. A child menu in a contextual menu hierarchy is then selected based on the context and is rendered in the user interface. In some implementations, the child menu includes a navigational element that links back to a parent of the child menu in the contextual menu hierarchy.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations of enhanced contextual menu technology disclosed herein allow a user to navigate directly from a child menu in a contextual menu hierarchy to a parent in the hierarchy, without having to cancel out of the child menu or otherwise take additional steps in the user interface. This is accomplished by first selecting the appropriate child menu based on the context surrounding content selected by user input. The child menu is surfaced with controls for interacting with the content and with a navigational element that takes the user to the parent menu, even though the parent menu has yet to be surfaced.

A software architecture is provide in an implementation that includes a manager component for driving a contextual menu process. The manager component may be called by applications when user input triggers the applications to surface a context menu. The applications rely on the manager component to determine which contextual menu to surface. In some scenarios the manager component communicates with other shared components to actually surface the contextual menu in a user interface to the application.

Various technical effects may be appreciated from the implementations of enhanced contextual menu technology disclosed herein. From a usability perspective, including a navigational element in a child menu that links back to a parent menu—even though the parent menu has yet to be surfaced—allows a user to more quickly navigate between contextual menus. Such an element also allows just one contextual menu in a hierarchy to be displayed at a time, which reduces screen clutter.

Furthermore, offloading the contextual menu process from on application to a manager component reduces the processing load on the application. This may increase the responsiveness of the application and its user interface to user input. In some cases, such an arrangement simplifies an application's interaction with operating system elements, reducing overall load on a processor.

Figure 1:
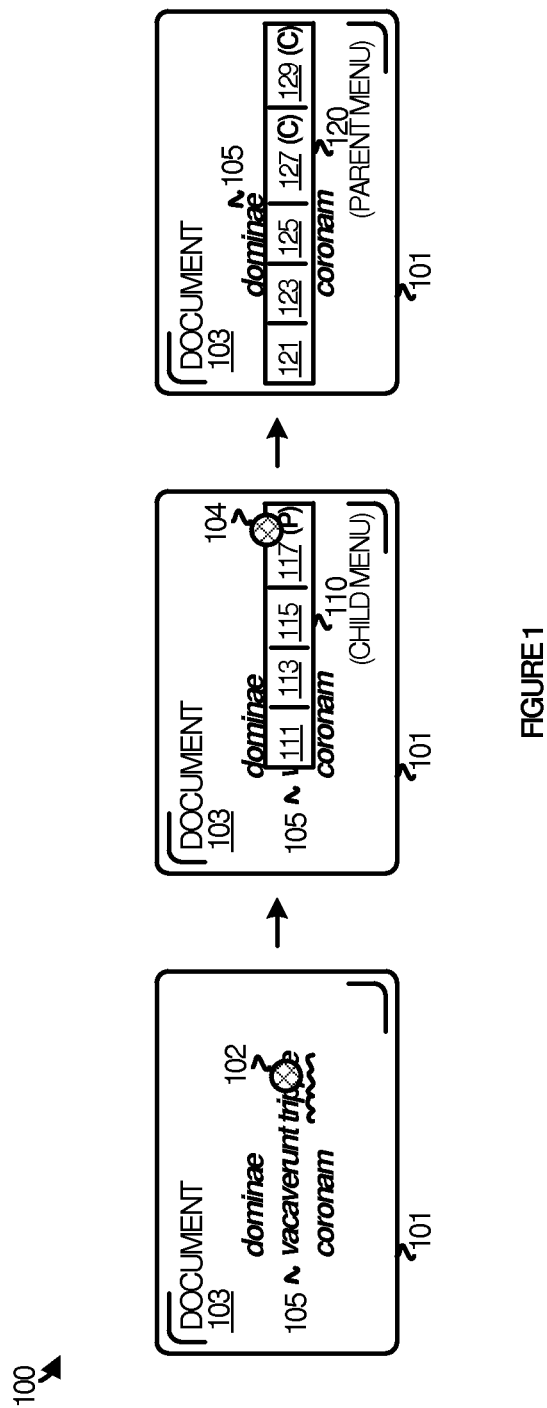
FIG. 1 illustrates an operational scenario an implementation of enhanced contextual menus.

FIG. 1 illustrates an operational scenario 100 in an implementation of enhanced contextual menus. Operational scenario 100 relates to a user interface 101 to an application, an example of which is provided in FIG. 2.

In this example scenario, user interface 101 includes a document 103 which has content 105 produced therein. In operation, a user input 102 is received that is made with respect to at least a portion of content 105. In this example, a word in a paragraph is selected by the user input 102, examples of which include a touch, a right-click, or other suitable user input. It may be appreciated that the selected word is "tripple," which is misspelled herein intentionally for illustrative purposes.

A child menu 110 is surfaced in response to the user input 102. The child menu 110 was selected based on the context of the content that was selected (that the selected word was flagged as being misspelled). Child menu 110 includes various controls represented by control 111, control 113, and control 115. Child menu 110 also includes a navigational element 117 that would allow a user to navigate to a parent of child menu 110.

It may be appreciated that child menu 110 is arranged horizontally. The horizontal layout of controls may be beneficial in the case of some small form-factor devices as they will not be occluded by a soft keyboard. However, child menu 110 could be arranged vertically, in a grid pattern, or in some other manner.

Continuing with the operational scenario, another user input—user input 104—is provided via user interface 101. User input 104 is a selection of navigational element 117, which triggers parent menu 120 to be surfaced. Parent menu 120 also includes various controls, represented by control 121, control 123, and control 125. A navigational element 127 is included via which a user can navigate back to child menu 110. Another navigational element 129 is also present (optional) via which the user can navigate back to another child menu (not shown).

In some implementations child menu 110 may itself be a parent of a child menu or menus. The other child menu, linked to via navigational element 129 (but not shown), could also be a parent to one or more child menus. Under such circumstances the nested child-menus could include a navigational element that links back to the parent-child menu. Optionally the nested child-menus could include a navigational element that links back to the grandparent menu, in addition to or in place of one that links to the parent.

Such nested menus

Figure 2:
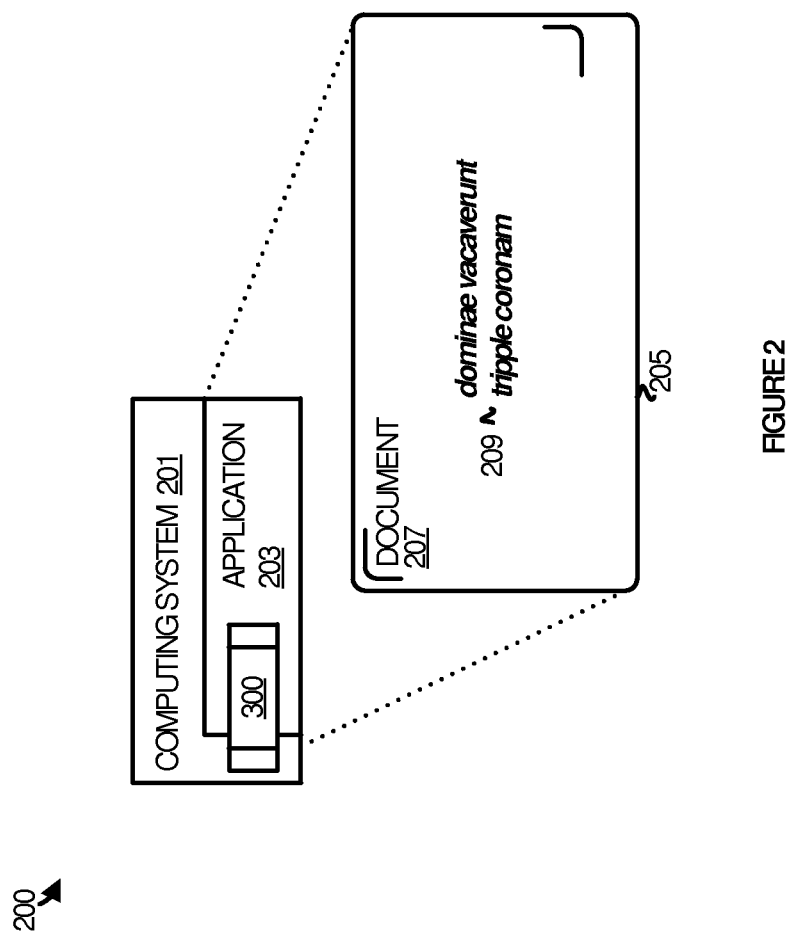
FIG. 2 illustrates an operational environment in an implementation.

Referring to FIG. 2, operational environment 200 includes computing system 201, which is representative of any physical or virtual computing device suitable for hosting an application capable of providing enhanced contextual menus. Application 203 represents one such application, examples of which include productivity applications (word processing, spreadsheets, presentations), personal information management applications (email, calendars, tasks), communication applications (voice, video, messaging), and any other application that supports contextual menus.

User interface 205 is representative of any user interface to an application. Document 207 is presented in user interface 205 and is representative of any word processing document, spreadsheet, presentation, email, instant message, blog post, or other suitable canvas with respect to which a contextual menu may be surfaced. Document 207 includes content 209, which in this example is represented by a string of words, although other types of content are possible, such as images, video, and the like.

Examples of computing system 201 include desktop or laptop computers, tablet computers, phablet computers, mobile phones, gaming devices, wearable devices, virtual machines, containers, and any combination or variation thereof capable of employing contextual menu process 300. Computing system 201 may include various hardware elements capable of supporting application 203, examples of which are illustrated FIG. 9 in the context of computing system 901.

Figure 3:
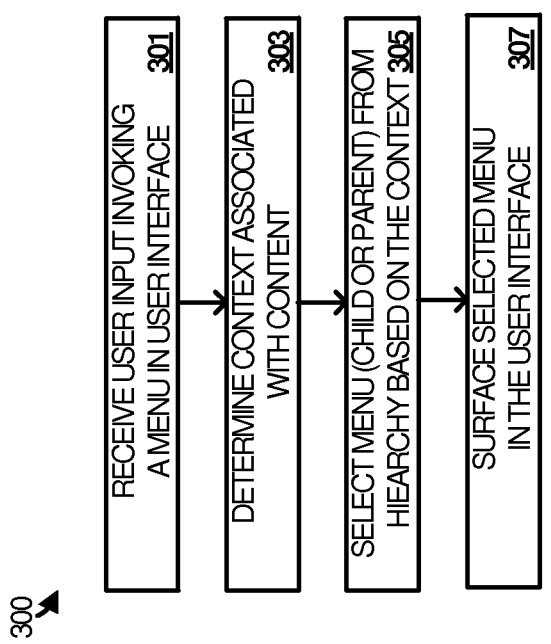
FIG. 3 illustrates a contextual menu process in an implementation.

Contextual menu process 300 is representative of any process or processes for providing enhanced contextual menus. Contextual menu process 300 may be implemented in program instructions in one or more software modules, components, libraries, or other collections of code capable of being executed by computing system 201. FIG. 3 illustrates in more detail the functionality provided by contextual menu process 300, which may be implemented in a single application or distributed across multiple applications or distinct programmatic entities.

Referring to parenthetically to the steps illustrated in FIG. 3, computing system 201 receives user input that invokes a contextual menu in a user interface in association with specific content (step 301). Examples of the user input include a touch, multiple touches, a right-click, and a spoken command, or any other suitable user input that selects content in the user interface. Computing system 201 determines the context associated with the selected content, such as whether or not it has been flagged as misspelled, flagged as including a hyperlink, or possibly not flagged at all (step 303).

An appropriate contextual menu is the selected from a hierarchy of contextual menus based on the context associated with the selected content (step 305). For instance, if the content is flagged as misspelled, then a proofing menu is selected. If the content is flagged as having a hyperlink, then a hyperlink menu is selected. If the content is not flagged at all or is otherwise indicated as having a base state or context, then a parent menu may be selected, an example of which is an edit menu.

Computing system 201 surfaces the selected menu in a user interface (step 307). Assuming a child menu is selected, the child menu may include various controls for interacting with the selected content, as well as a link to a parent menu.

Figure 4:
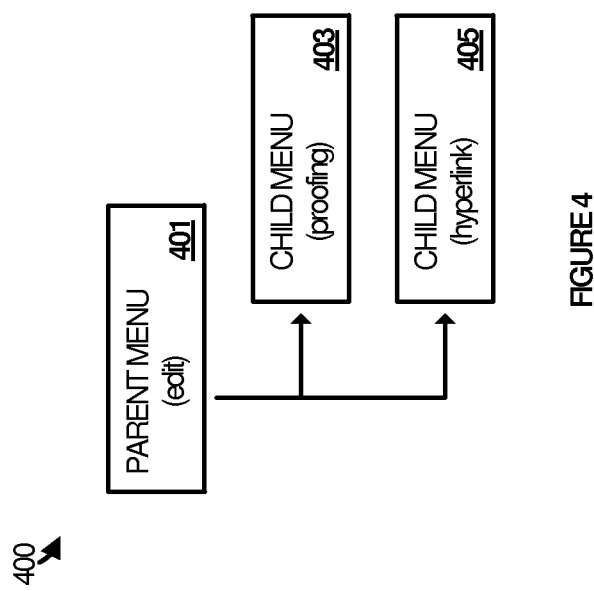
FIG. 4 illustrates a contextual menu hierarchy in an implementation.
Figure 5A:
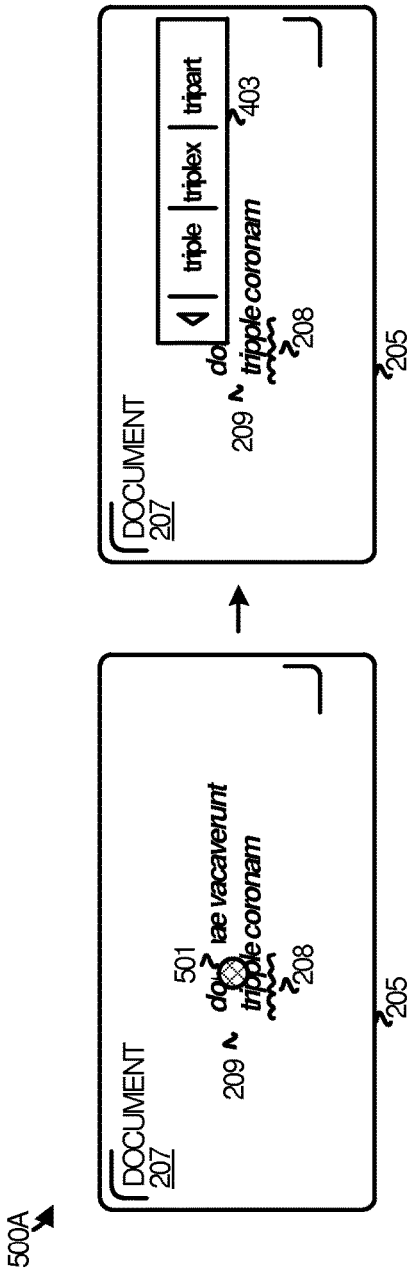
FIGS. 5A illustrates an operational scenario an implementation.
Figure 5B:
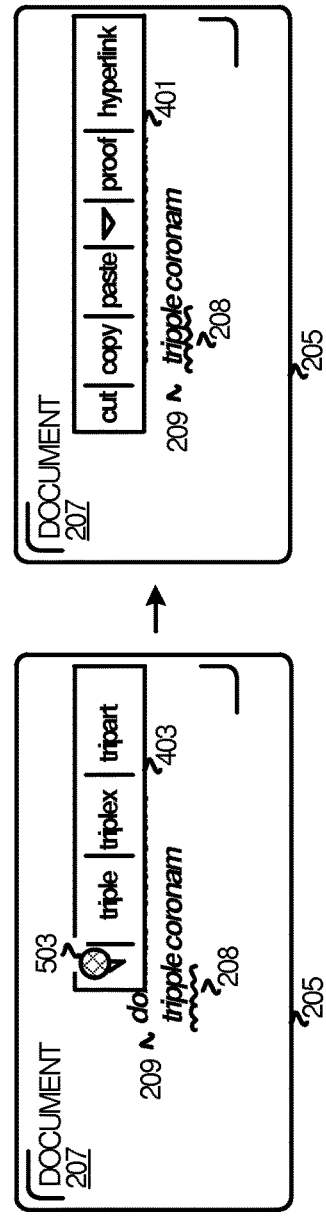
FIGS. 5B illustrates an operational scenario an implementation.
Figure 5C:
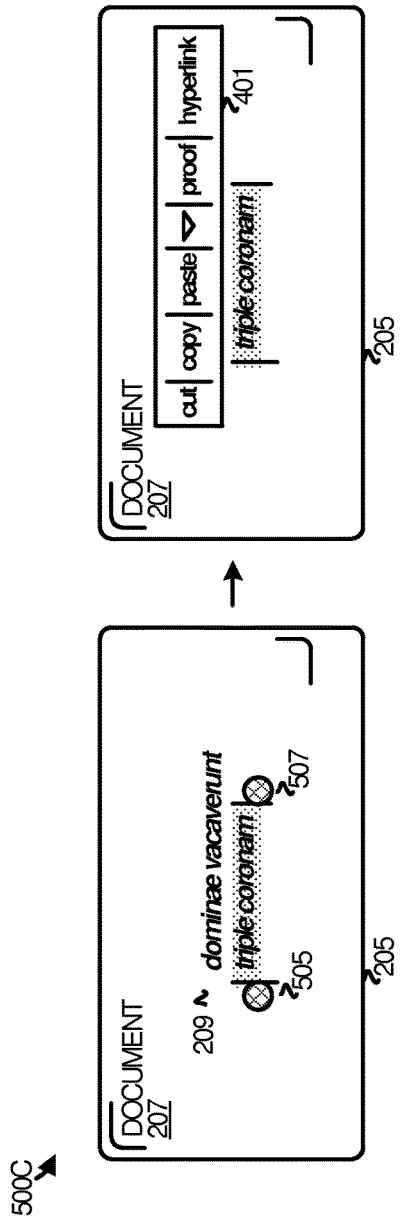
FIGS. 5C illustrates an operational scenario an implementation.
Figure 5D:
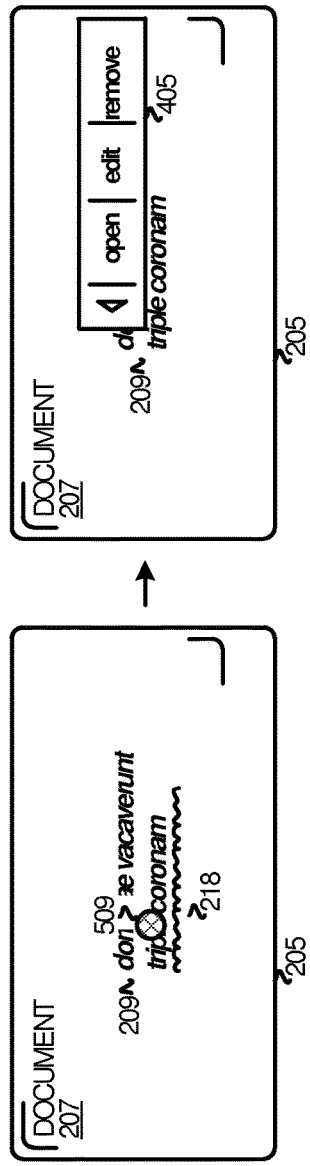
FIGS. 5D illustrates an operational scenario an implementation.

FIG. 4 illustrates a contextual menu hierarchy 400 in an example that may exist in the context menus of application 203. Contextual menu hierarchy 400 includes a parent menu 401 (editing), a child menu 403 (proofing), and another child menu 405 (hyperlinking). Other child menus in addition to or in place of those disclosed herein are possible and may be considered within the scope of the present application.

FIGS. 5A-5D illustrate various operational scenarios representative of the operation of computing system 201 in relation to application 203, contextual menu process 300, and contextual menu hierarchy 400.

Operational scenario 500A begins with user interface 205, which shows document 207 and content 209. A misspelled word 208 ("tripple") is included in content 209 for representative purposes. A "squiggly" underlines the misspelled word 208 to indicate visually to a user that the word has been tagged as potentially misspelled.

A user input 501 is then received via user interface 205 that comprises a selection of the misspelled word 208. As the context surrounding the word is that it has been flagged for spelling correction, child menu 403 is immediately surfaced to provide suggestions for correcting the error. Child menu 403 includes various suggestions, including the words triple, triplex, and tripart. Child menu 403 also includes a back button for navigating "back" to its parent menu, even though the menu was never displayed.

In operational scenario 500B, the user selects the back button from child menu 403 via a user input 503. Selecting the back button navigates the user to parent menu 401. Parent menu 401 includes various controls for interacting with content 209, including cut, copy, and paste controls.

Parent menu 401 also includes two options for navigating back to child menu 403 (proof) and to child menu 405 (hyperlink). A navigational element is also available to allow the user to drill into additional options for the paste control.

In operational scenario 500C, it is assumed for exemplary purposes that the misspelled word 208 has been corrected to read "triple." As such, the visual indication of incorrect spelling has disappeared. However, the user may wish to interact with the string "triple coronam" and does so via a multi-touch interaction that includes user input 505 and user input 507. Parent menu 401 surfaces as a result.

Operational scenario 500D begins with the assumption that the user has selected (touched, clicked on) the hyperlink option in parent menu 401 in order to add a hyperlink to the string 218 that reads "triple coronam." Thus, the string 218 is underlined in user interface 205. The user may desire to interact with the hyperlink and so provides a user input 509 to bring up a contextual menu.

In response to the user input 509, the context surrounding string 218 is identified, which as mentioned is that string 218 includes a hyperlink. Accordingly, child menu 405 is rendered and includes controls for interacting with the hyperlink (open, edit, remove). Child menu 405 also includes a back button for surfacing parent menu 401.

In some scenarios a child or parent menu may be too large to fit entirely on a screen. In such situations the menu may be horizontally scrollable such that the user can pull the menu left or right, to bring menu options into view on their screen.

Menu stacking is also a possibility in some scenarios. In FIGS. 5A-5D the parent menu replaces the child menu or the child menu replaces the parent menu. However, either menu could be persisted while the other menu is "stacked" above it visually.

Figure 6:
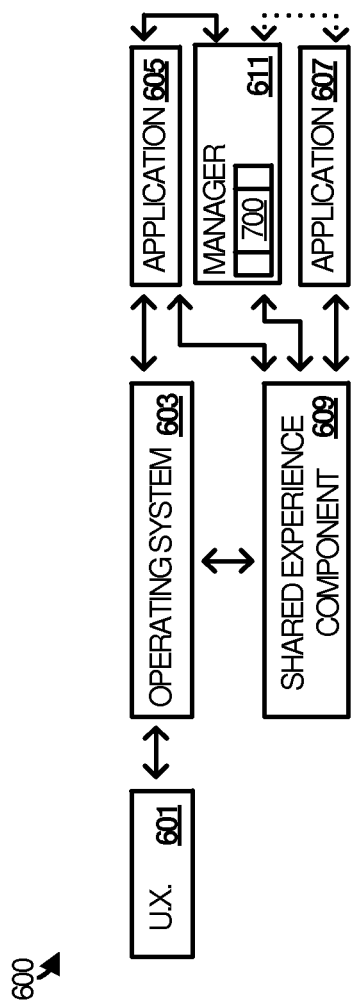
FIG. 6 illustrates a software architecture in an implementation.

FIG. 6 illustrates a software architecture 600 in an implementation of enhanced contextual menus. Software architecture 600 may be implemented on any suitable computing system or collection thereof, of which computing system 901 is representative. Included in software architecture 600 are user experience 601, operating system 603, application 605, application 607, manager 611, and shared experience component 609. Manager 611 includes contextual menu process 700.

User experience 601 is representative of the input/output paths via which a user may interact with an application, whether it be application 605, application 607, or some other application. Operating system 603 links applications to user experience 601 and examples include Windows®, Android®, and iOS®. Application 605 communicates with operating system 603, but also communicates with shared experience component 609.

Shared experience component 609 is a component or collection of components that may be called upon by multiple applications to handle some aspects of the user experience that the applications share in common For instance, shared experience component 609 may be capable of rendering dialog boxes, menus, and other graphical objects. Shared experience component 609 communicates with operating system 603 in order to drive at least some aspects of user experience 601.

Manager 611 is representative of code that may be called by at least application 605 (possibly other applications) in order to employ contextual menu process 700. Manager 611 also communicates with shared experience component 609. Manager 611 may be implemented in program instructions to implement the functionality illustrated in FIG. 7.

Figure 7:
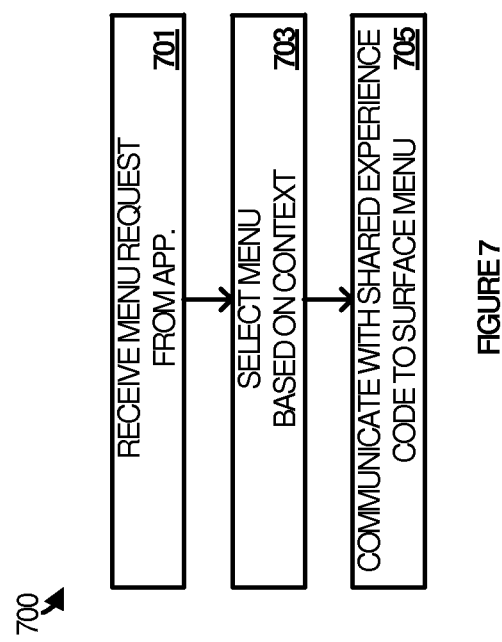
FIG. 7 illustrates a contextual menu process in an implementation.

Referring parenthetically to the steps shown in FIG. 7, the manager 611 receives a menu request from an application (step 701). The menu request may identify the context associated with content for which a contextual menu has been invoked. In some scenarios manager 611 may be tasked with determining the context.

Next, manager 611 selects an appropriate menu from a contextual menu hierarchy based on the context (step 703). Having selected the menu, manager 611 communicates with shared experience component 609 to surface the selected menu (step 705) so that shared experience component 609 can drive user experience 601.

Figure 8:
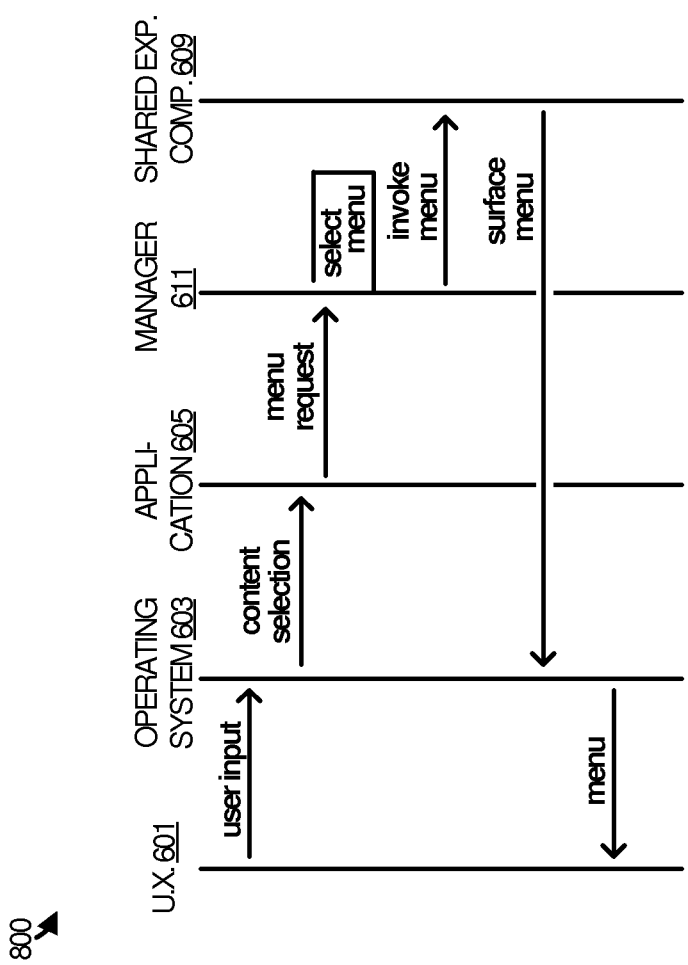
FIG. 8 illustrates an operational flow in an implementation.

FIG. 8 illustrates an operational sequence when contextual menu process 700 is employed in the context of software architecture 600. In operation, a user input is made via user experience 601, such as a touch, right-click, spoken command, or the like. Operating system 603 notifies application 605 that content has been selected by the user input and application 605 responsively calls into manager 611.

Manager 611, per contextual menu process 700, selects a contextual menu to surface based on the context surrounding the selected content. Manager 611 then communicates with shared experience component 609 to invoke the selected menu, whether it be a child menu, a parent menu, or some other menu. Shared experience component 609 communicates with operating system 603 to surface the menu, which is displayed via user experience 601 to the user.

Figure 9:
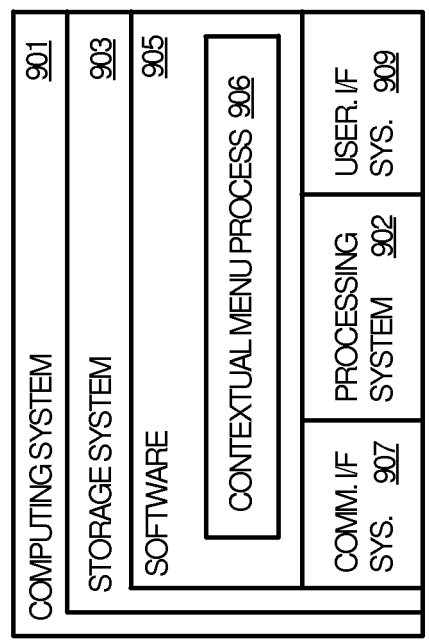
FIG. 9 illustrates a computing system suitable for implementing the enhanced contextual menu technology disclosed herein, including any of the environments, architectures, elements, processes, and operational scenarios and sequences illustrated in the Figures and discussed below in the Technical Disclosure.

FIG. 9 illustrates computing system 901 that is representative of any system or collection of systems in which the various applications, services, scenarios, and processes disclosed herein may be implemented. Examples of computing system 901 include, but are not limited to, smart phones, laptop computers, tablet computers, desktop computers, hybrid computers, gaming machines, virtual reality devices, smart televisions, and smart watches and other wearable devices, as well as any variation or combination thereof. Other examples may include server computers, rack servers, web servers, cloud computing platforms, data center equipment, virtual machines, and containers, and any combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes contextual menu process 906, which is representative of the processes discussed with respect to the preceding FIGS. 1-8, including contextual menu process 300 and contextual menu process 700. When executed by processing system 902 to enhance contextual menus, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced contextual menus.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include contextual menu process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced contextual menus. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface, examples of which are provided by user interface 101 and user interface 205.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

EXAMPLE 1

A computing apparatus comprising: a storage system having program instructions stored thereon for facilitating contextual menus in a user interface to an application; and a processing system operatively coupled with the storage system; wherein the program instructions, when executed by the processing system, direct the processing system to at least: responsive to user input that invokes a menu in association with content presented in the user interface, determine a context associated with the content; determine which child menu in a contextual menu hierarchy to surface based at least in part on the context associated with the content; and surface, in the user interface to the application, at least the child menu and a navigational element linked back to a parent menu in the contextual menu hierarchy.

EXAMPLE 2

The computing apparatus of Example 1 wherein the parent menu is a parent of a plurality of child menus in the contextual menu hierarchy and wherein the child menu is a child of the parent menu in the contextual menu hierarchy.

EXAMPLE 3

The computing apparatus of Examples 1-2 wherein the parent menu comprises an edit menu having editing controls for editing the content.

EXAMPLE 4

The computing apparatus of Examples 1-3 wherein the child menu comprises a proofing menu having proofing controls for proofing the content.

EXAMPLE 5

The computing apparatus of Examples 1-4 wherein the content comprises a character string and wherein the context associated with the content comprises whether or not the character string has been flagged as misspelled.

EXAMPLE 6

The computing apparatus of Examples 1-5 wherein the child menu comprises a hyperlink menu having hyperlink controls for interacting with hyperlinks.

EXAMPLE 7

The computing apparatus of Examples 1-6 wherein the content comprises a character string and wherein the context associated with the content comprises whether or not the character string has been flagged as including a hyperlink.

EXAMPLE 8

A method for facilitating contextual menus comprising: in a computing system, receiving responsive user input that invokes a menu in association with content presented in a user interface to an application; in the computing system, determining a context associated with the content; in the computing system, determining which child menu in a contextual menu hierarchy to surface based at least in part on the context associated with the content; and in the computing system, surfacing in the user interface to the application at least the child menu and a navigational element linked back to a parent menu in the contextual menu hierarchy.

EXAMPLE 9

The method of Example 8 wherein the parent menu is a parent of a plurality of child menus in the contextual menu hierarchy and wherein the child menu is a child of the parent menu in the contextual menu hierarchy.

EXAMPLE 10

The method of Examples 8-9 wherein the parent menu comprises an edit menu having editing controls for editing the content.

EXAMPLE 11

The method of Examples 8-10 wherein the child menu comprises a proofing menu having proofing controls for proofing the content.

EXAMPLE 12

The method of Examples 8-11 wherein the content comprises a character string and wherein the context associated with the content comprises whether or not the character string has been flagged as misspelled.

EXAMPLE 13

The method of Examples 8-12 wherein the child menu comprises a hyperlink menu having hyperlink controls for interacting with hyperlinks.

EXAMPLE 14

The method of Examples 8-13 wherein the content comprises a character string and wherein the context associated with the content comprises whether or not the character string has been flagged as including a hyperlink.

EXAMPLE 15

A computing apparatus comprising: one or more computer readable storage media; program instructions stored one the one or more computer readable storage media for facilitating contextual menus in a user interface to an application that, when executed by a processing system, direct the processing system to at least: receive a menu request from the application, triggered in the application by user input invoking a menu in association with content presented in the user interface; in response to the menu request, determine which child menu in a contextual menu hierarchy to surface based at least in part on a context associated with the content; and communicate a display request to surface, in the user interface to the application, at least the child menu and a navigational element linked back to a parent menu in the contextual menu hierarchy.

EXAMPLE 16

The computing apparatus of Example 15 wherein the parent menu is a parent of a plurality of child menus in the contextual menu hierarchy and wherein the child menu is a child of the parent menu in the contextual menu hierarchy.

EXAMPLE 17

The computing apparatus of Examples 15-16 wherein the parent menu comprises an edit menu having editing controls for editing the content and wherein the child menu comprises a proofing menu having proofing controls for proofing the content.

EXAMPLE 18

The computing apparatus of Examples 15-17 wherein the content comprises a character string and wherein the context associated with the content comprises whether or not the character string has been flagged as misspelled.

EXAMPLE 19

The computing apparatus of Examples 15-18 wherein the parent menu comprises an edit menu having editing controls for editing the content the child menu comprises a hyperlink menu having hyperlink controls for interacting with hyperlinks.

EXAMPLE 20

The computing apparatus of Examples 15-19 wherein the content comprises a character string and wherein the context associated with the content comprises whether or not the character string has been flagged as including a hyperlink.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
   a computer readable storage media having program instructions stored thereon for facilitating contextual menus in a user interface to an application; and
   a processor operatively coupled with the computer readable storage media;
   wherein the program instructions, when executed by the processor, direct the processor to at least:
   display a document comprising content in the user interface to the application;
   receive a first user input that invokes a menu for interacting with a portion of the content;
   responsive to the first user input, determine a context associated with the portion of the content;
   select one of a plurality of child menus in a contextual menu hierarchy of menus having controls for interacting with the content to surface based at least in part on the context associated with the portion of the content;
   surface, in the user interface to the application, at least all of the items in the child menu and a navigational element that links back to a parent menu of the child menu in the contextual menu hierarchy without displaying items from menu levels above or below the child menu in the contextual menu hierarchy;
   receive a second user input selecting the navigational element; and
   responsive to the second user input, surface the parent menu of the child menu and a second navigational element that links to the child menu in the contextual menu hierarchy without displaying items from menu levels above or below the surfaced parent menu in the contextual menu hierarchy.

2. The computing apparatus of claim 1 wherein the parent menu comprises a parent of a plurality of child menus in the contextual menu hierarchy and wherein the child menu comprises a child of the parent menu in the contextual menu hierarchy.

3. The computing apparatus of claim 2 wherein the parent menu comprises an edit menu having editing controls for editing the content.

4. The computing apparatus of claim 3 wherein the child menu comprises a proofing menu having proofing controls for proofing the content.

5. The computing apparatus of claim 4 wherein the content comprises a character string and wherein the context associated with the content comprises whether or not the character string has been flagged as misspelled.

6. The computing apparatus of claim 3 wherein the child menu comprises a hyperlink menu having hyperlink controls for interacting with hyperlinks.

7. The computing apparatus of claim 6 wherein the content comprises a character string and wherein the context associated with the content comprises whether or not the character string has been flagged as including a hyperlink.

8. A method for facilitating contextual menus comprising:
in a computing system, displaying a document comprising content in a user interface to an application;
in the computing system, receive a first user input that invokes a menu for interacting with a portion of the content;
in the computing system, responsive to the first user input, determining a context associated with the portion of the content;
in the computing system, selecting one of a plurality of child menus in a contextual menu hierarchy of menus having controls for interacting with the content to surface based at least in part on the context associated with the portion of the content;
in the computing system, surfacing in the user interface to the application at least all of the items in the child menu and a navigational element that links back to a parent menu of the child menu in the contextual menu hierarchy without displaying items from menu levels above or below the child menu in the contextual menu hierarchy;
in the computing system, receiving a second user input selecting the navigational element; and
in the computing system, responsive to the second user input, surfacing the parent menu of the child menu and a second navigational element that links to the child menu in the contextual menu hierarchy without displaying items from menu levels above or below the surfaced parent menu in the contextual menu hierarchy.

9. The method of claim 8 wherein the parent menu comprises a parent of a plurality of child menus in the contextual menu hierarchy and wherein the child menu comprises a child of the parent menu in the contextual menu hierarchy.

10. The method of claim 9 wherein the parent menu comprises an edit menu having editing controls for editing the content.

11. The method of claim 10 wherein the child menu comprises a proofing menu having proofing controls for proofing the content.

12. The method of claim 11 wherein the content comprises a character string and wherein the context associated with the content comprises whether or not the character string has been flagged as misspelled.

13. The method of claim 10 wherein the child menu comprises a hyperlink menu having hyperlink controls for interacting with hyperlinks.

14. The method of claim 13 wherein the content comprises a character string and wherein the context associated with the content comprises whether or not the character string has been flagged as including a hyperlink.

15. A computing apparatus comprising:
one or more computer readable storage media;
program instructions stored one the one or more computer readable storage media for facilitating contextual menus in a user interface to an application that, when executed by a processor operatively coupled with the computer readable storage media, direct the processor to at least:
display a document comprising content in the user interface to the application;
receive a menu request from the application, triggered in the application by a first user input invoking a menu for interacting with a portion of the contents
in response to the menu request, determine a context associated with the portion of the content;
in response to the menu request, select one of a plurality of child menus in a contextual menu hierarchy of menus having controls for interacting with the content to surface based at least in part on a context associated with the portion of the content;
communicate a display request to surface, in the user interface to the application, at least all of the items in the child menu and a navigational element that links back to a parent menu of the child menu in the contextual menu hierarchy, without displaying items from menu levels above or below the child menu in the contextual menu hierarchy;
receive a second menu request, from the application, triggered in the application by a second user input selecting the navigational element; and
responsive to the second me nu request, surface the parent me nu of the child menu and a second navigational element that links to the child menu in the contextual menu hierarchy without dis playing items from menu levels above or below the surfaced parent menu in the contextual menu hierarchy.

16. The computing apparatus of claim 15 wherein the parent menu is a parent of a plurality of child menus in the contextual menu hierarchy and wherein the child menu is a child of the parent menu in the contextual menu hierarchy.

17. The computing apparatus of claim 16 wherein the parent menu comprises an edit menu having editing controls for editing the content and wherein the child menu comprises a proofing menu having proofing controls for proofing the content.

18. The computing apparatus of claim 17 wherein the content comprises a character string and wherein the context associated with the content comprises whether or not the character string has been flagged as misspelled.

19. The computing apparatus of claim 15 wherein the parent menu comprises an edit menu having editing controls for editing the content; and the child menu comprises a hyperlink menu having hyperlink controls for interacting with hyperlinks.

20. The computing apparatus of claim 19 wherein the content comprises a character string and wherein the context associated with the content comprises whether or not the character string has been flagged as including a hyperlink.

* * * * *